United States Patent
Hoss (10) Patent No.: US 10,293,227 B2
(45) Date of Patent: May 21, 2019

(54) APPARATUS FOR APPLYING GRIPPING TO A TAPERED ELONGATED SHAFT

(71) Applicant: Steven Hoss, Udon Thani (TH)

(72) Inventor: Steven Hoss, Udon Thani (TH)

( * ) Notice: Subject to any disclaimer, the term of this patent is extended or adjusted under 35 U.S.C. 154(b) by 3 days.

(21) Appl. No.: 15/494,479

(22) Filed: Apr. 22, 2017

(65) Prior Publication Data
US 2018/0304129 A1 Oct. 25, 2018

(51) Int. Cl.
*B23P 11/00* (2006.01)
*A63B 57/60* (2015.01)
*F16M 11/22* (2006.01)
*F16B 7/02* (2006.01)

(52) U.S. Cl.
CPC .............. *A63B 57/60* (2015.10); *F16M 11/22* (2013.01); *F16B 7/02* (2013.01); *F16M 2200/08* (2013.01)

(58) Field of Classification Search
CPC .......... B23Q 1/0063; B23Q 1/03; B23Q 3/00; B23Q 3/06; B23P 11/00; B23P 11/005; B23P 19/00; B23P 19/04
See application file for complete search history.

(56) References Cited

U.S. PATENT DOCUMENTS

| | | | | |
|---|---|---|---|---|
| 1,660,329 A * | 2/1928 | Fleming | ..................... | B25B 1/04 269/128 |
| 4,783,893 A * | 11/1988 | Farino | ..................... | A63B 53/02 29/426.5 |
| 4,891,877 A * | 1/1990 | Talavera | ............... | B21D 39/046 29/237 |
| 4,910,849 A * | 3/1990 | Marshall | ................. | B25B 27/02 29/239 |
| 5,687,464 A * | 11/1997 | Marshall | ................. | A63B 53/02 29/263 |
| 5,722,140 A * | 3/1998 | Marshall | ................. | A63B 53/02 29/263 |
| 5,870,815 A * | 2/1999 | Karner | .................... | A63B 53/14 29/407.1 |
| 6,449,823 B2 * | 9/2002 | Krapp | ..................... | B25B 13/48 29/239 |
| 2014/0265087 A1 * | 9/2014 | Aguayo | .................. | B25B 5/003 269/9 |

* cited by examiner

Primary Examiner — Lee D Wilson (57) ABSTRACT

In an embodiment, a gripping collar may comprise an outer shell, a shoulder, and a receiving area. The gripping collar may be operable to receive a tapered elongated shaft at the receiving area. The shoulder may protrude from the outer shell. A support base may comprise an aperture. The aperture may be wider than at least a portion of the outer shell of the gripping collar and narrower than an outer edge of the shoulder of the gripping collar. When the gripping collar is inserted into the aperture, a bottom side of the shoulder may rest against a top side of the support base or aperture.

15 Claims, 8 Drawing Sheets

APPARATUS FOR APPLYING GRIPPING TO A TAPERED ELONGATED SHAFT

TECHNICAL FIELD

This disclosure generally relates to sporting equipment repair.

BACKGROUND

Golf clubs consist of a single tapered elongated tube with a club head on one end and a grip on the other end. Between the grip and the club head is a smooth tapered elongated tube. Conventional golf club grips, which have been in use for more than fifty years, are commonly made from cord, rubber, synthetic blends or various combinations of the these materials. With regular play, these grips wear out, get damaged, lose elasticity or become too soft.

When this happens, a golf club needs to be re-gripped. The re-gripping process requires cutting off the old grip with a sharp instrument, cleaning the golf club shaft with solvent, applying two-sided tape to the golf club shaft and finally, as recommended by grip manufacturers, affixing the golf club into a stationary vise and applying a solvent to the tape before slipping the grip over the end of the shaft and applying enough pressure to the grip to force it to seat tightly to the golf club shaft. Once the new grip is in place it must be adjusted to ensure that, if the new grip contains a manufactures logo, it is in alignment with the golf club and that the twist indicators are in alignment before the solvent dries.

This re-gripping process appears to be a daunting task for do-it-yourselfers. For example, virtually of all the golf club grip kits currently on the market come with a black rubber pad that is designed to fit between the jaws of a stationary vise and protect the golf club shaft from damage by the jaws of the stationary vise as the golf club shaft is firmly clamped into the stationary vise during the re-gripping process.

Many golfers do not have access to a workshop or to a stationary vise to hold the golf club steady as the new grip is applied. Therefore, golfers generally resort to having their golf clubs re-gripped by golf equipment professionals, which is usually time consuming and substantially increases the cost of re-gripping their entire set of golf clubs.

SUMMARY OF INVENTION

In particular embodiments, a gripping vise may enable golfers to re-grip their own golf clubs easily and affordably. The gripping vise may be portable and compact enough to use in most rooms of a household (e.g., living room, bedroom, kitchen, bathroom), or outdoors. The gripping vise may comprise two pieces: a gripping collar, and a support base. Both the gripping collar and the support base may be an injection molded polypropylene and/or polycarbonate assembly. The support base may comprise a base and an aperture. The support base may be placed as a bridge between any two stable surfaces of approximately the same height and having enough ground clearance to allow a portion of the golf club to hang underneath. As an example, the two stable surfaces may be two stools, a countertop and a stool, the user's own knees, two tables, or any other suitable surface.

The gripping collar may be made of one or more pieces that may fit around the shaft of a golf club. The gripping collar may also have an outer shell that has a shoulder protruding out from it. At least part of the outer shell may be small enough to fit into the aperture, and at least part of the outer shell (e.g., the shoulder) may be large enough such that a bottom surface of the shoulder rests on a top surface of the support base when at least part of the outer shell is inserted into the aperture. Most golf club shafts are tapered: they have a larger circumference near the gripping end and a smaller circumference near the golf club head. The gripping collar may have a hollow tube that is tapered to fit snugly around the golf club shaft, such that when the golf club shaft is in place in the gripping collar and at least part of the gripping collar is inserted into the aperture of the support base, a downward force may be applied to the golf club, and the support base and gripping collar may resist the downward force, such that the golf club remains fixed. This may allow enough vertical force from above to be applied to the golf club to allow the user to push a replacement grip fully onto the golf club shaft. Once the replacement grip is installed, the gripping collar can be removed from the golf club shaft and the support base can be removed by slipping it over the gripped end of the golf club shaft. The replacement grip can then be adjusted for proper alignment, length and twist and finally be set aside for the solvent to dry which will firmly adhere the replacement grip to the golf club shaft.

DETAILED DESCRIPTION OF INVENTION

In particular embodiments, a gripping vise may enable golfers to re-grip their own golf clubs easily and affordably. The gripping vise may be portable and compact enough to use in most rooms of a household (e.g., living room, bedroom, kitchen, bathroom), or outdoors. The gripping vise may comprise two pieces: a gripping collar, and a support base. Both the gripping collar and the support base may be an injection molded polypropylene and/or polycarbonate assembly. The support base may comprise a base and an aperture. The support base may be placed as a bridge between any two stable surfaces of approximately the same height and having enough ground clearance to allow a portion of the golf club to hang underneath. As an example, the two stable surfaces may be two stools, a countertop and a stool, the user's own knees, two tables, or any other suitable surface.

The gripping collar may be made of one or more pieces that may fit around the shaft of a golf club. The gripping collar may also have an outer shell that has a shoulder protruding out from it. At least part of the outer shell may be small enough to fit into the aperture, and at least part of the outer shell (e.g., the shoulder) may be large enough such that a bottom surface of the shoulder rests on a top surface of the support base when at least part of the outer shell is inserted into the aperture. Most golf club shafts are tapered: they have a larger circumference near the gripping end and a smaller circumference near the golf club head. The gripping collar may have a hollow tube that is tapered to fit snugly around the golf club shaft, such that when the golf club shaft is in place in the gripping collar and at least part of the gripping collar is inserted into the aperture of the support base, a downward force may be applied to the golf club, and the support base and gripping collar may resist the downward force, such that the golf club remains fixed. This may allow enough vertical force from above to be applied to the golf club to allow the user to push a replacement grip fully onto the golf club shaft. Once the replacement grip is installed, the gripping collar can be removed from the golf club shaft and the support base can removed by slipping it over the gripped end of the golf club shaft. The replacement grip can then be adjusted for proper alignment, length and twist and finally be set aside for the solvent to dry which will firmly adhere the replacement grip to the golf club shaft.

In particular embodiments, a gripping collar may comprise an outer shell, a shoulder that protrudes from the outer shell, and a receiving area, wherein the gripping collar is operable to receive an elongated shaft at the receiving area. In particular embodiments a support base may comprise an aperture, wherein the aperture is wider than at least a portion of the outer shell of the gripping collar and narrower than an outer edge of the shoulder of the gripping collar.

Figure 1:
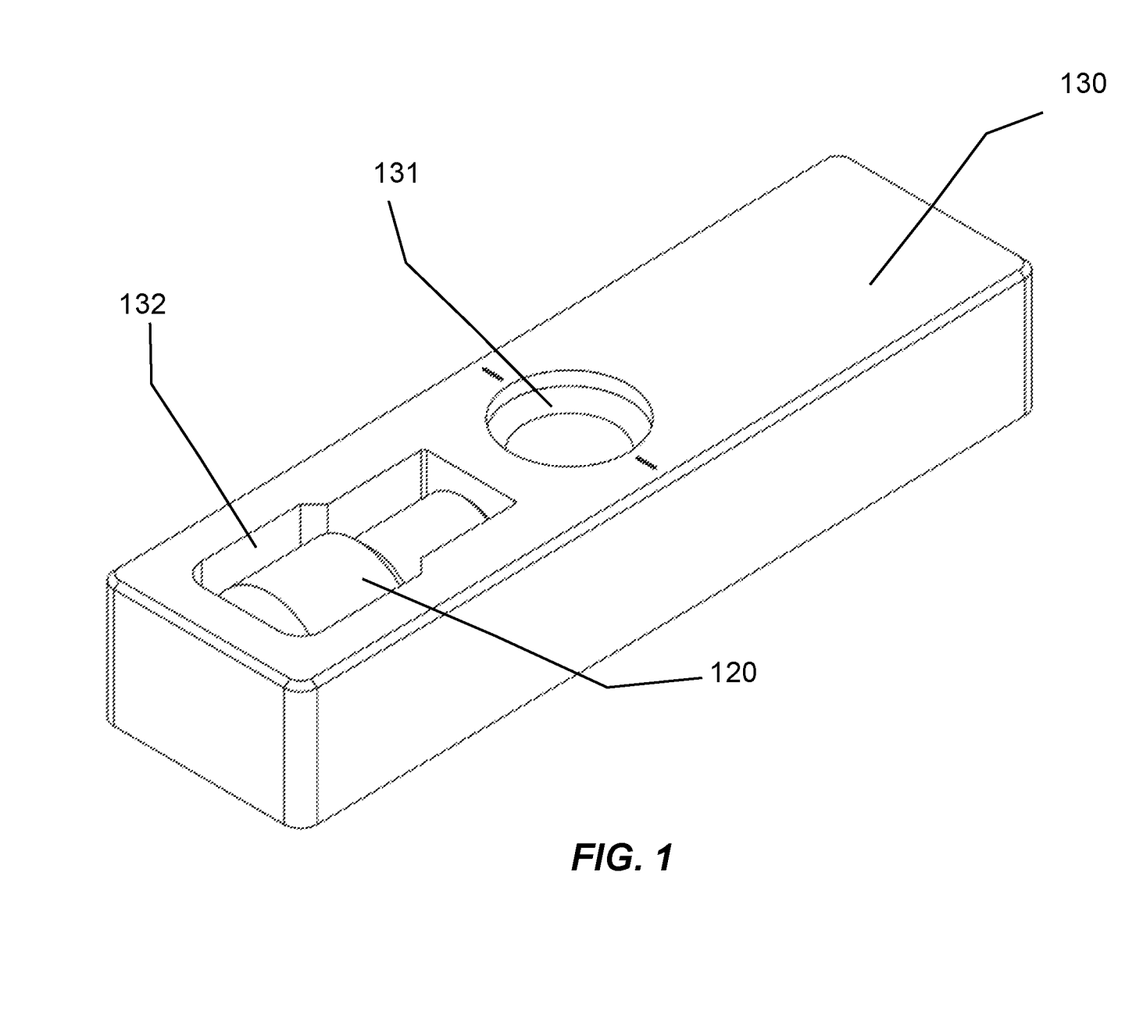
FIG. 1 illustrates an example gripping collar stored in an example compartment of an example support base.

FIG. 1 illustrates an example gripping collar 120 stored in an example compartment 132 of an example support base 130. The support base 130 may include an aperture 131 through which at least a portion of the gripping collar 120 may be inserted. In particular embodiments, the aperture 131 may be a simple hole in a top portion of the support base 130, or the aperture 131 may have a tiered wall structure, similar to that shown in FIG. 1. A tiered wall structure may provide extra stability to the gripping collar 120 when it is inserted into the aperture 131. Although a particular gripping collar 120 and support base 130 are shown and discussed in this disclosure, this disclosure contemplates any suitable type of gripping collar and support base, having any suitable structure or dimensions. As an example, this disclosure contemplates support bases of various sizes and shapes, such as circular, elliptical, etc. As another example, this disclosure contemplates gripping collars of various sizes and shapes, such as rectangular, as will be discussed below.

Figure 2A:
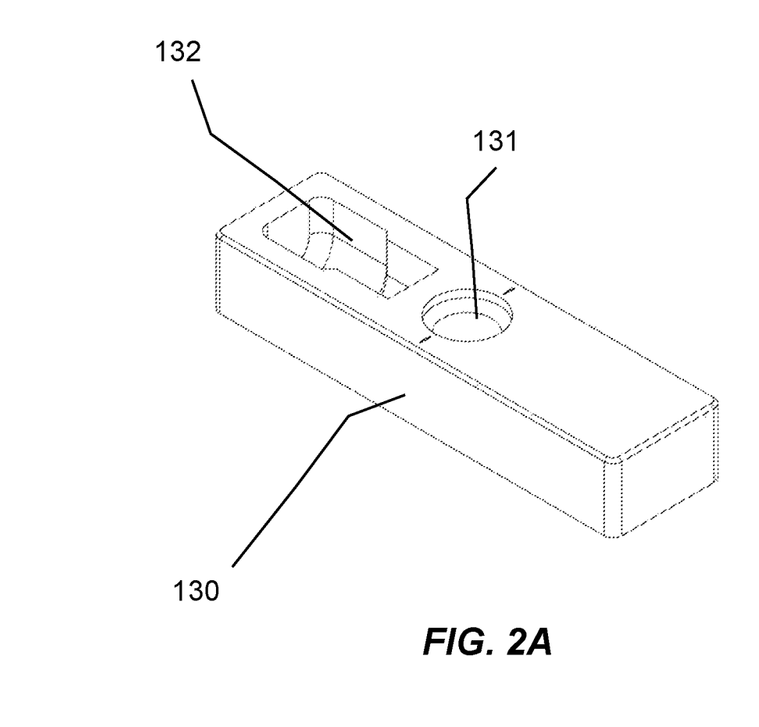
FIG. 2A illustrates an example support base.
Figure 2B:
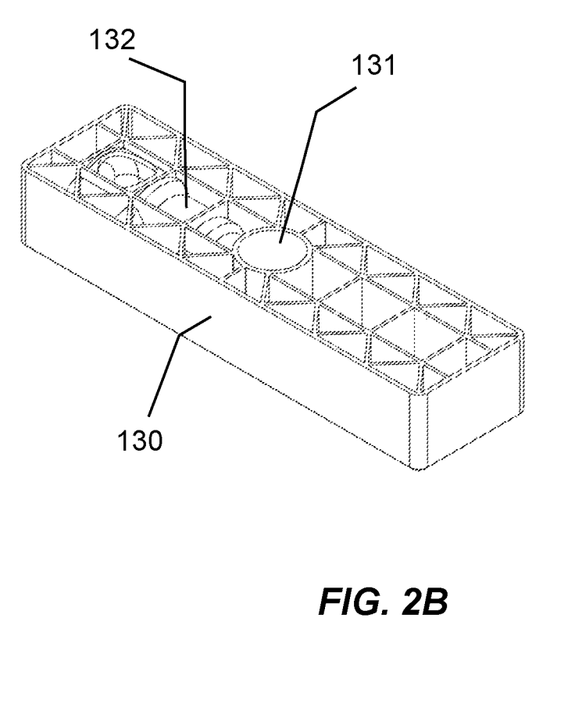
FIG. 2B illustrates another view of the example support base.

FIGS. 2A and 2B illustrate an example support base 130. The support base 130 may include an aperture 131 through which at least a portion of the gripping collar 120 may be inserted. In particular embodiments, the aperture 131 may be a simple hole in a top portion of the support base 130, or the aperture 131 may have a tiered wall structure, similar to that shown in FIG. 1. The aperture 131 shown in FIG. 1 has a single tier (e.g., the aperture 131 may have a top level which may be on the same plane as the top surface of the support base 130 and a second level which is below the top surface of the support base 130). In particular embodiments, aperture 131 may have two or more tiers (e.g., the aperture 131 may have a third level which is below the second level of the aperture discussed above). A tiered wall structure may provide extra stability to the gripping collar 120 when it is inserted into the aperture 131. In particular embodiments, the wall of the aperture 131 may be longer (e.g., three inches long), to add more stability for the gripping collar. In particular embodiments, the aperture 131 may have screw threads, such that the gripping collar may be screwed into place within the aperture 131 of the support base 130. Although a particular support base 130 is shown and discussed in this disclosure, this disclosure contemplates any suitable type of gripping collar and support base, having any suitable structure or dimensions. As an example, this disclosure contemplates support bases of various sizes and shapes, such as circular, elliptical, etc.

Figure 3A:
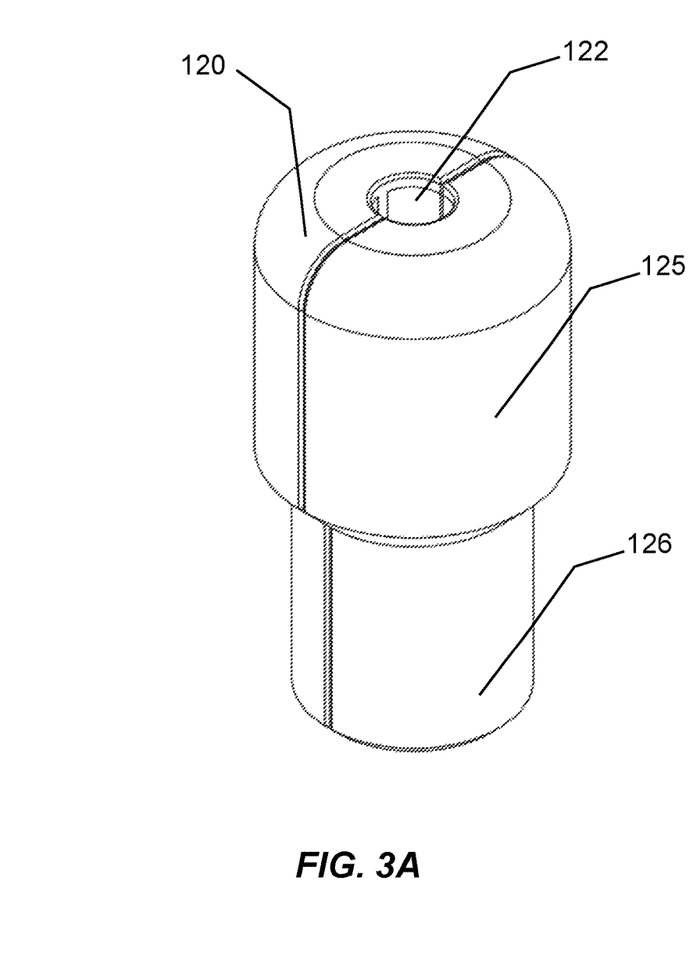
FIG. 3A illustrates an example gripping collar.
Figure 3B:
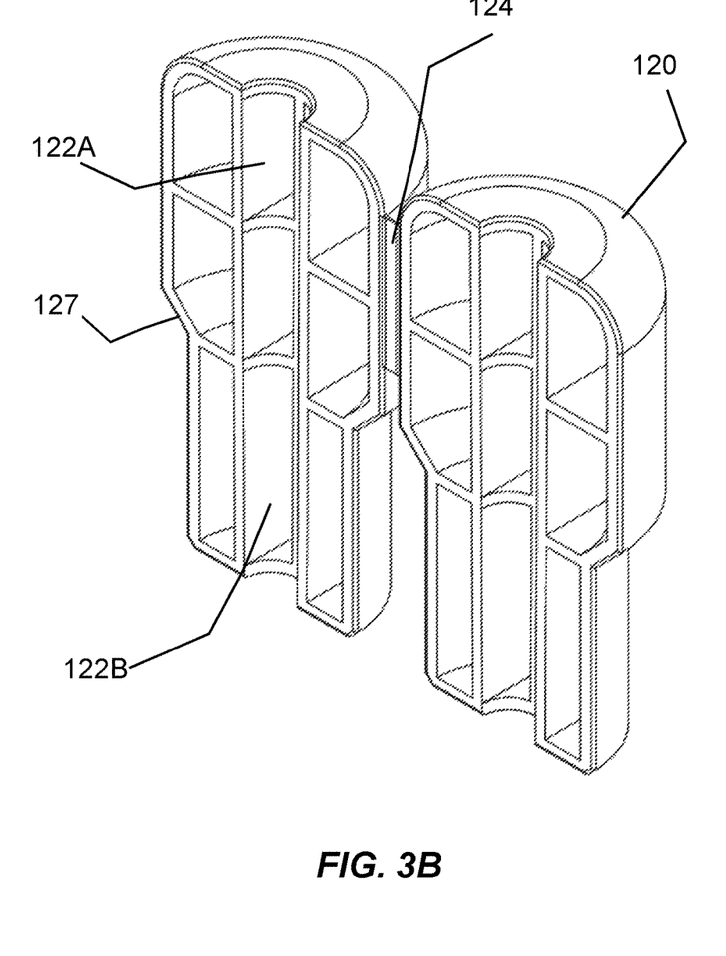
FIG. 3B illustrates another view of the example gripping collar.

FIGS. 3A and 3B illustrate an example gripping collar 120. The gripping collar 120 may comprise an outer shell, which may be made of an upper portion 125 and a lower portion 126. The gripping collar 120 may further comprise a receiving area 122, a shoulder 127, and a hinge 124. In particular embodiments, the upper portion 125 may be cylindrical and may have a circumference that is larger than the lower portion 126. In particular embodiments, the upper portion may be rectangular, or may be any other suitable shape. In particular embodiments, the upper portion may have a circumference (e.g., if cylindrical) that is the same as or smaller than the lower portion 126. In particular embodiments, the shoulder 127 may protrude (e.g., extend) away from the outer shell at a tapered angle or at a right angle. In particular embodiments, the shoulder may be a lip or a flange. In particular embodiments, the shoulder 127 may extend far enough out from the lower portion 126 of the outer shell so that it rests on a top surface of the support base 130. This top surface may be the actual top surface of support base 130, or may be a top surface within the aperture 131, as shown in FIGS. 1, 2A, and 2B. The receiving area 122 of the gripping collar 120 may comprise a hollow tube or tube-like structure, which may be designed to receive the shaft of a golf club. This disclosure describes a particular gripping collar 120 and support base 130, but this disclosure contemplates any suitable gripping collar or support base, such as a gripping collar and support base that are rectangular in shape instead of cylindrical, or vice versa.

In particular embodiments, the receiving area 122 may be tapered to mimic the taper of the shaft of a golf club. The receiving area 122 may have a top end 122A and a bottom end 122B. Each of these ends may have a circumference, and the circumference of the top end 122A may be larger than the circumference of the bottom end 122B. In particular embodiments, the gripping collar 120 may be divided into two pieces and connected by a hinge 124. The hinge 124 may be made of the same material as the gripping collar 120 or may be made of any suitable material. The hinge 124 may consist of a single piece of material or may consist of multiple pieces of material. Any suitable hinge is contemplated by this disclosure. The receiving area 122 may receive the shaft of a golf club by means of the two pieces of the gripping collar 120 and the hinge 124. The shaft of the golf club may be placed in the receiving area 122 when the gripping collar is open, as is shown in FIG. 3B. When the shaft of the golf club is in place, the gripping collar 122 may be closed around the shaft to "lock" it in place. To be locked in place may mean that when the gripping collar 120 is closed, the golf club cannot move down in relation to the gripping collar. When the gripping collar is inserted into the aperture 131, the tapered receiving area 122, in combination with the shoulder 127, may allow a downward force to be applied to the golf club without the golf club slipping down inside the gripping collar. This disclosure describes a particular gripping collar 120, but this disclosure contemplates any suitable gripping collar, such as a gripping collar that is rectangular in shape instead of cylindrical. As another example, the gripping collar may function equally as well with an upper portion that has the same width as the lower portion, so long as a shoulder, lip, flange, or other suitable protrusion acts to prevent the entire gripping collar from sliding through an aperture in the support base.

Figure 4:
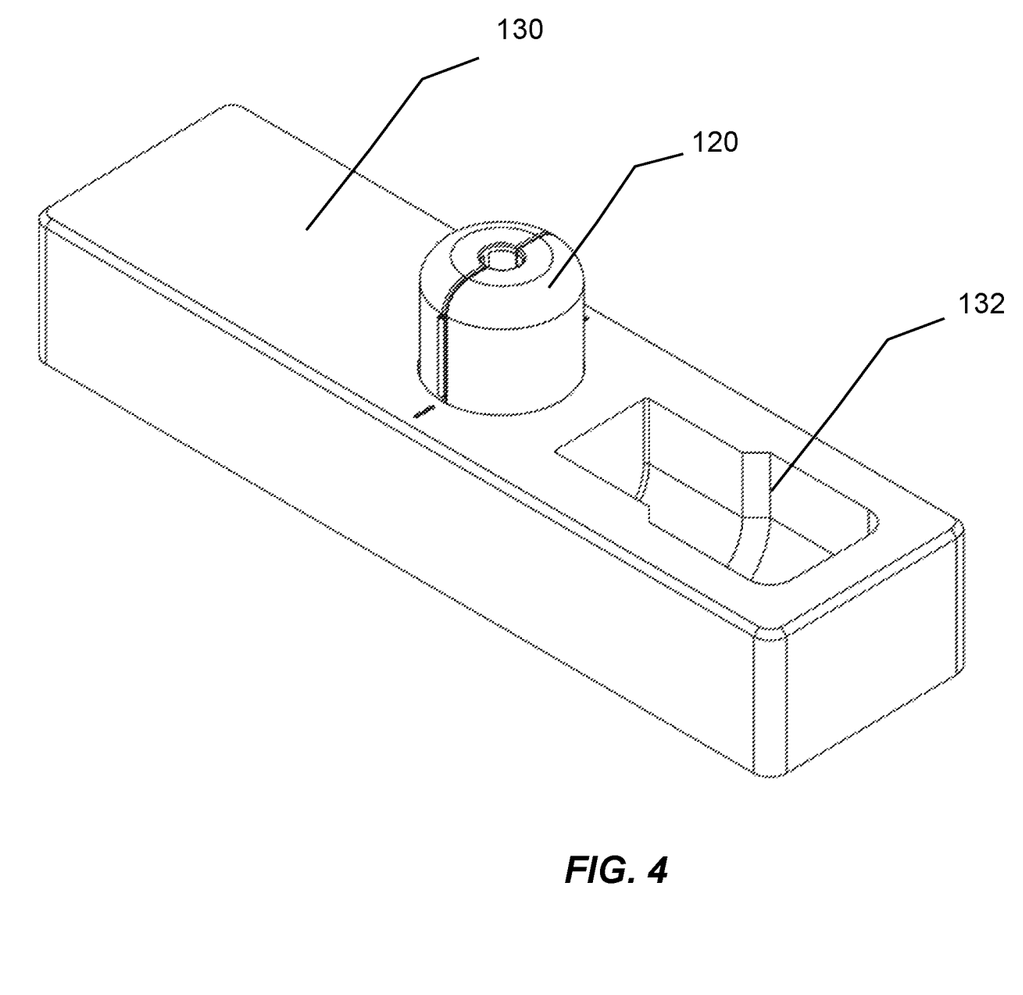
FIG. 4 illustrates an example gripping collar at least part of which is inserted into an example aperture of an example support base.

FIG. 4 illustrates an example gripping collar at least part of which is inserted into an example aperture of an example support base. In this illustration, the bottom portion 126 of the outer shell of the gripping collar may be below the top surface of the support base 130. Additionally, the shoulder 127 may be resting on top of a top surface of the support base 130, which may be the uppermost surface of support base 130, or may be a top surface within the aperture 131, as shown in FIGS. 1, 2A, and 2B. In particular embodiments, the gripping collar 120 may be screwed into the support base 130 by means of screw threads. In particular embodiments, the support base 130 may include a compartment 132 for storing the gripping collar 120 when the gripping vise is not in use. Although a particular gripping collar 120 and support base 130 are shown and discussed in this disclosure, this disclosure contemplates any suitable type of gripping collar and support base, having any suitable structure or dimensions. As an example, this disclosure contemplates support bases and gripping collars of various sizes and shapes, such as circular, elliptical, rectangular, and so on.

Figure 5:
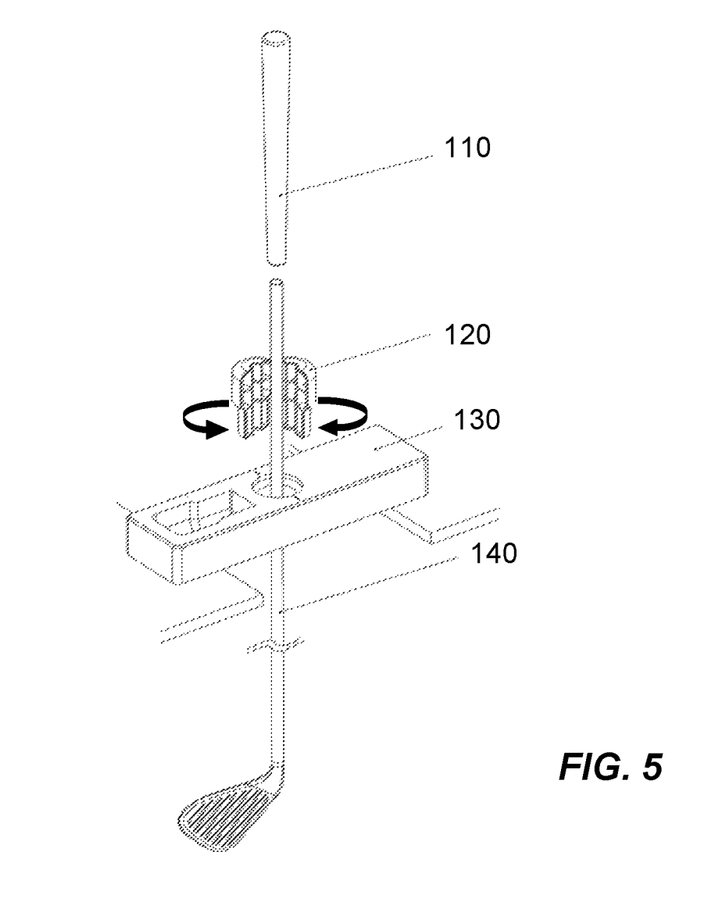
FIG. 5 illustrates an example assembly for an example gripping collar, example support base, and example golf club.

FIG. 5 illustrates an example assembly for an example gripping collar, example support base, and example golf club. In the example assembly of FIG. 5, the gripping collar 120 is illustrated as being in the open position, ready to receive the shaft of the golf club 140. The golf club has a golf club grip 110, which is not yet affixed to the shaft of golf club 140. The support base may be positioned between two sturdy or semi-sturdy structures, such as two tables, stools, or the like. The arrows surrounding the gripping collar 120 show how the two sides of the gripping collar 120 enclose around the shaft of the golf club 140. Although this disclosure describes the gripping vise in a particular manner, this disclosure contemplates any suitable gripping vise.

Figure 6:
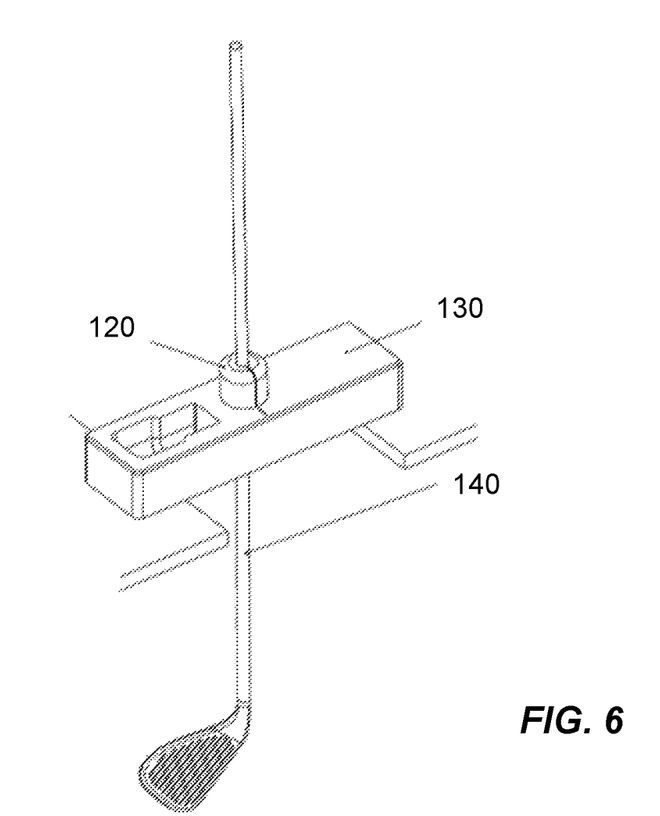
FIG. 6 illustrates another example assembly for an example gripping collar, example support base, and example golf club.

FIG. 6 illustrates another example assembly for an example gripping collar, example support base, and example golf club. In this example illustration, the gripping collar 120 fully encloses the golf club 140, and a portion of the gripping collar 120 is inserted into the aperture 131 (not labeled) of support base 130. Although not expressly illustrated in FIG. 6, it may be appreciated by those skilled in the art that the shoulder 127 of the gripping collar 120 is adjacent to a surface of the support base 130 or the aperture 131 such that the shoulder 127 prevents the gripping collar 120 from sliding all the way through the aperture 131. In particular embodiments, the shaft of the golf club 140 may be tapered, with the circumference of the shaft becoming increasingly smaller from the top of the golf club down to the head of the golf club. Thus, the portion of the shaft nearest the head of the golf club 140 may have a smaller circumference than the portion of the shaft nearer to the top of the golf club 140 (e.g., where the grip 110 will be installed). The receiving area 122 of the gripping collar may be similarly tapered such that the golf club shaft may be incapable of sliding down the receiving portion 122 of the gripping collar 120 past a particular point. Although this disclosure describes the gripping vise in a particular manner, this disclosure contemplates any suitable gripping vise.

Figure 7:
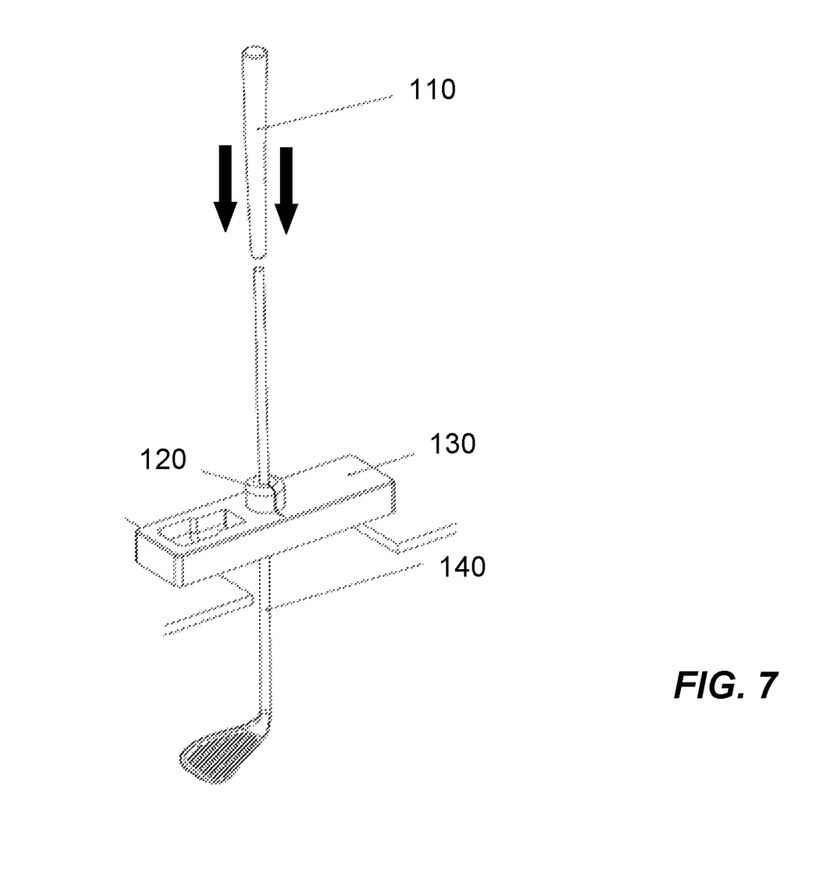
FIG. 7 illustrates another example assembly for an example gripping collar, example support base, and example golf club.

FIG. 7 illustrates another example assembly for an example gripping collar, example support base, and example golf club. At this point in the assembly, the golf club grip 110 may be ready to be installed on the golf club 140. In particular embodiments, adhesive may be applied to the top of the golf club so that the golf club grip 110 may adhere to the golf club 140. In particular embodiments an solvent substance may be applied that first acts as a lubricant while the golf club grip 110 is being pushed down onto the golf club 140 and, once the golf club grip 110 is in place on the golf club 140, "sets" or the solvent dries to become an adhesive and ensures that the golf club grip 110 remains fixed to the golf club 140. As discussed above, the receiving area 122 of the gripping collar may be tapered such that the top of the receiving area 122 (e.g., top end 122A) is larger than the bottom of the receiving area (e.g., bottom end 122B). This may have the effect of ensuring that when a downward force is applied to the golf club grip 110 and in turn the golf club 140, the golf club shaft may be incapable of sliding down the receiving area 122 of the gripping collar 120 past a particular point. This may allow for a secure and full installation of the golf club grip 110. Although this disclosure describes the gripping vise in a particular manner, this disclosure contemplates any suitable gripping vise.

Figure 8:
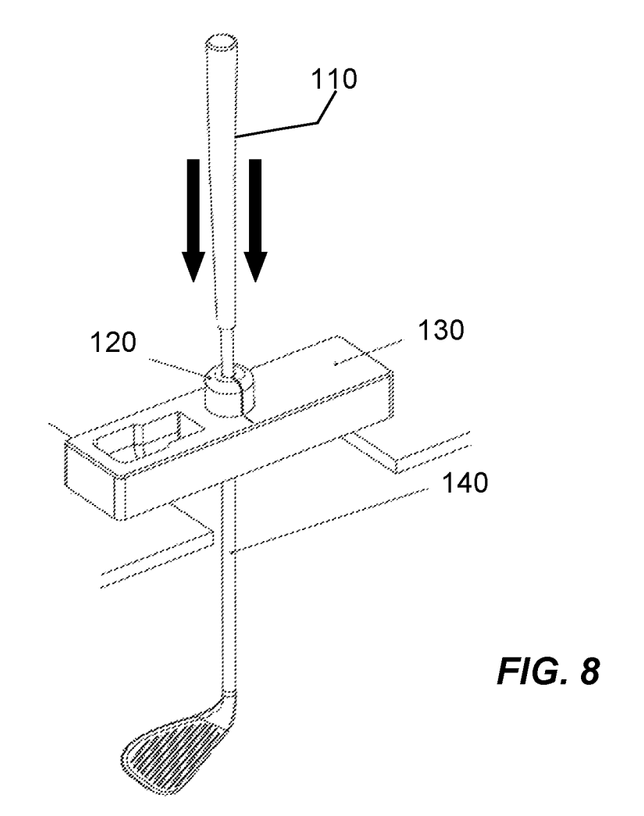
FIG. 8 illustrates another example assembly for an example gripping collar, example support base, and example golf club.

FIG. 8 illustrates another example assembly for an example gripping collar, example support base, and example golf club. At this point in the assembly, the golf club grip 110 may be fully installed onto the golf club 140. Once the golf club grip 110 is fully installed (e.g., it cannot be pushed down farther onto the golf club 140), the user may make small adjustments to the orientation of the golf club grip 110 by twisting the golf club grip 110 to the left or to the right as he or she so desires. Then the user may allow the solvent to dry and make a complete adhesion between the golf club grip 110 and the golf club 140. Although this disclosure describes the gripping vise in a particular manner, this disclosure contemplates any suitable gripping vise.

What is claimed is:

1. A system comprising:
   a gripping collar comprising an outer shell, a shoulder, and a receiving area, wherein:
      the gripping collar is operable to receive a tapered elongated shaft at the receiving area, wherein the gripping collar further comprises a hinge, and wherein the gripping collar encloses around the elongated shaft by means of the hinge; and
      the shoulder protrudes from the outer shell; and
   a support base comprising an aperture, wherein the aperture is wider than at least a portion of the outer shell of the gripping collar and narrower than an outer edge of the shoulder of the gripping collar.

2. The system of claim 1, wherein the aperture is configured to receive the gripping collar.

3. The system of claim 1, wherein a bottom side of the shoulder rests on a top side of the support base when at least a portion of the outer shell of the gripping collar is inserted into the aperture.

4. The system of claim 1, wherein the gripping collar is cylindrical.

5. The system of claim 1, wherein the support base further comprises a compartment for storing the gripping collar.

6. The system of claim 1, wherein the gripping collar is further operable to enclose around the shaft such that the shaft can only move in one direction in relation to the gripping collar when the gripping collar is enclosed around the shaft.

7. The system of claim 1, wherein the receiving area comprises a hollow tube, the hollow tube comprising a top end and a bottom end, wherein the top end has a circumference that is larger than a circumference of the bottom end.

8. An gripping collar comprising:
an outer shell;
a shoulder protruding from the outer shell; and
a receiving area comprising a tapered hollow tube operable to receive a tapered elongated shaft, and wherein:
at least a portion of the outer shell is capable of being inserted into an aperture of a support base, the aperture being wider than at least a portion of the outer shell and narrower than an outer edge of the shoulder;
wherein the gripping collar further comprises a hinge, and wherein the gripping collar encloses around the elongated shaft by means of the hinge.

9. The apparatus of claim 8, wherein the tapered hollow tube comprises a top end and a bottom end, the top end having a top circumference and the bottom end having a bottom circumference, wherein the top circumference is larger than the bottom circumference.

10. The apparatus of claim 8, wherein the receiving area is capable of receiving a shaft of a golf club, and the outer shell and the receiving area are capable of enclosing around the shaft of the golf club such that the shaft can only move in one direction in relation to the outer shell when the outer shell is enclosed around the shaft.

11. The apparatus of claim 8, wherein the outer shell has a cylindrical shape.

12. The apparatus of claim 8, wherein the outer shell has a rectangular shape.

13. The apparatus of claim 8, wherein a bottom side of the shoulder rests on a top side of the support base when at least a portion of the outer shell is inserted into the aperture of the support base.

14. An apparatus comprising:
a support base, wherein the support base comprises an aperture, wherein the aperture is wider than at least a portion of an outer shell of a gripping collar and narrower than an outer edge of a shoulder of the gripping collar, wherein when the portion of the outer shell of the gripping collar is inserted into the aperture, a top side of the support base makes contact with a bottom side of the shoulder, wherein the support base further comprises a compartment capable of storing the gripping collar.

15. The apparatus of claim 14, wherein the support base is rectangular in shape.

* * * * *